Jan. 23, 1968 J. B. McGAY 3,364,944
VALVE
Filed Feb. 5, 1965 5 Sheets-Sheet 2
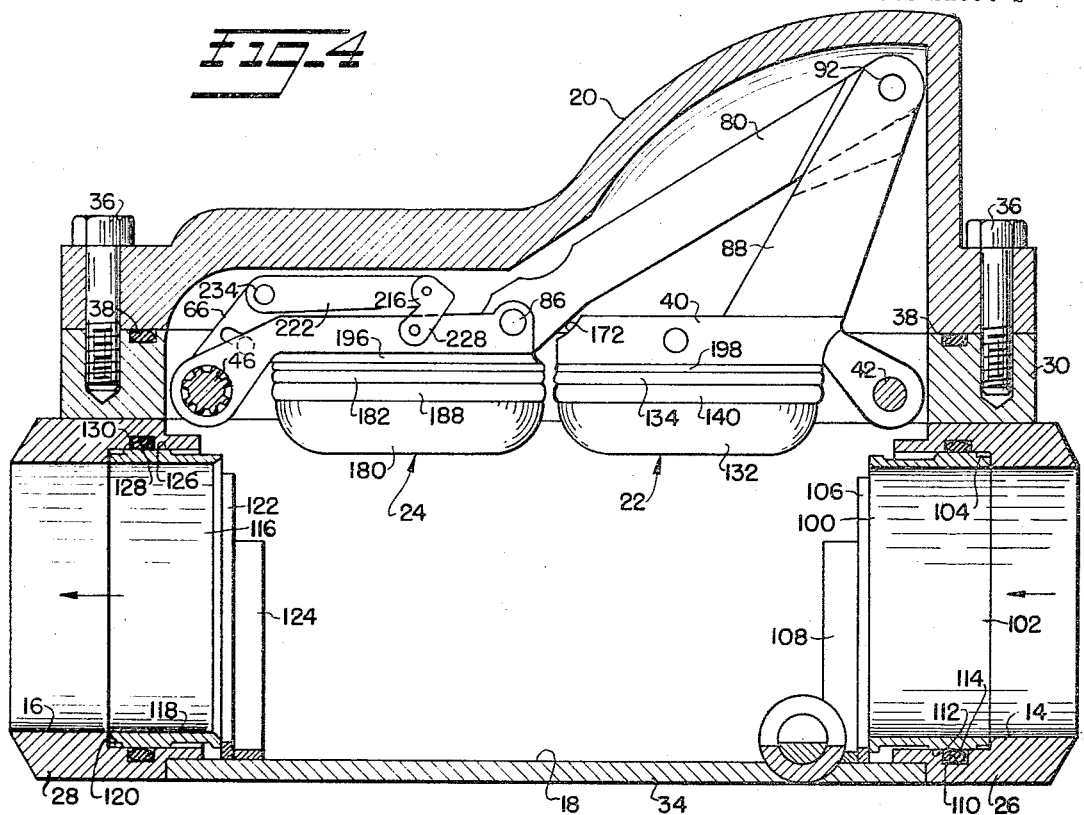
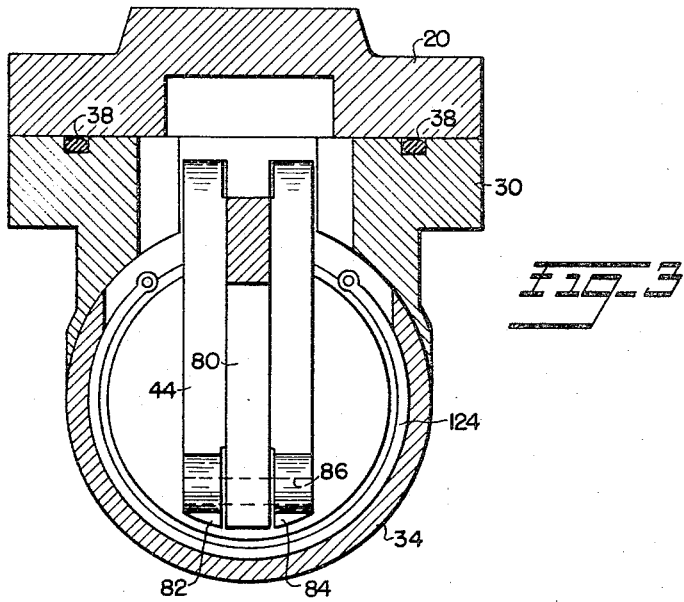
INVENTOR
JOHN B. MC GAY
BY *Strauch, Nolan & Neale*
ATTORNEYS

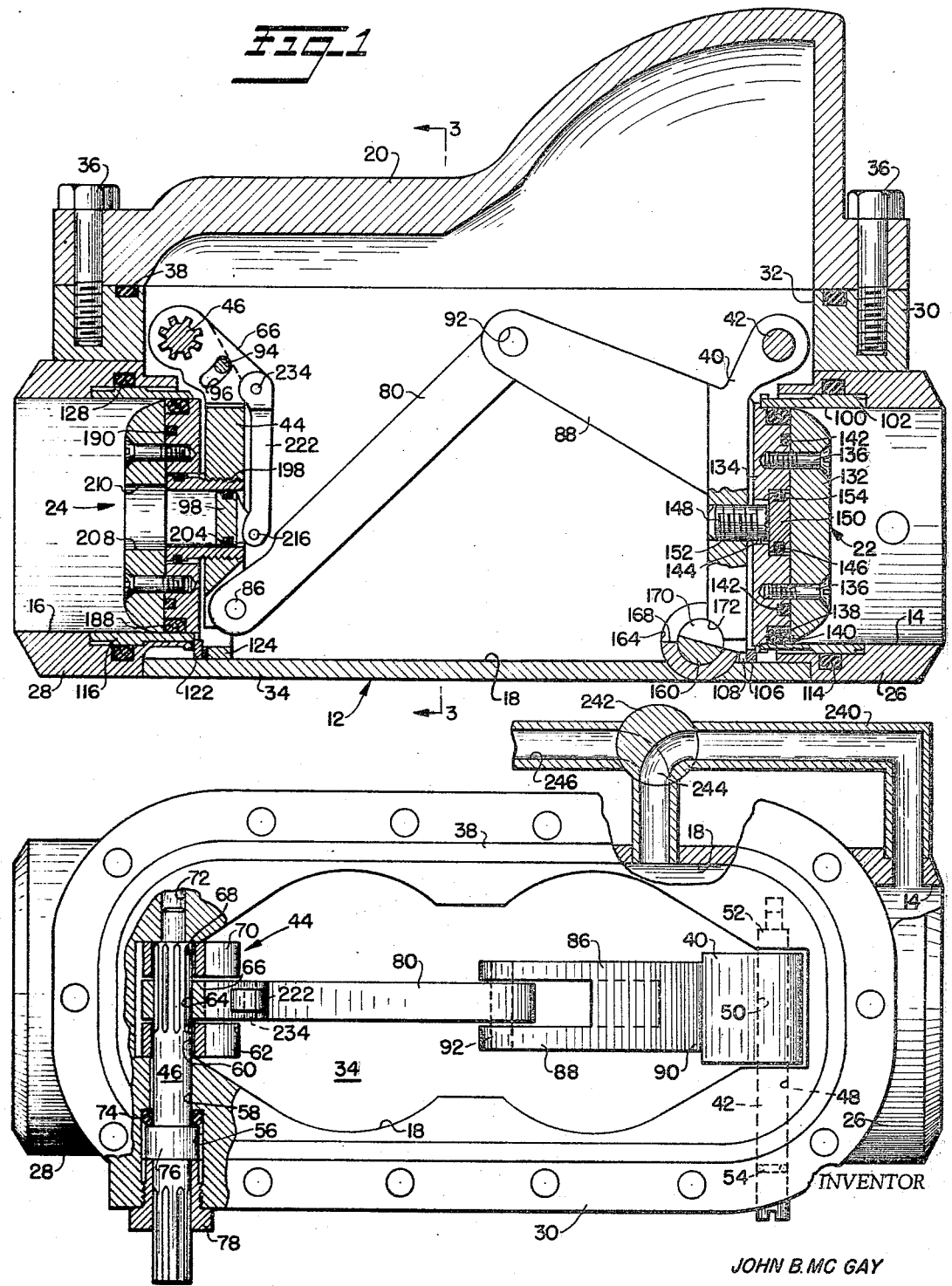

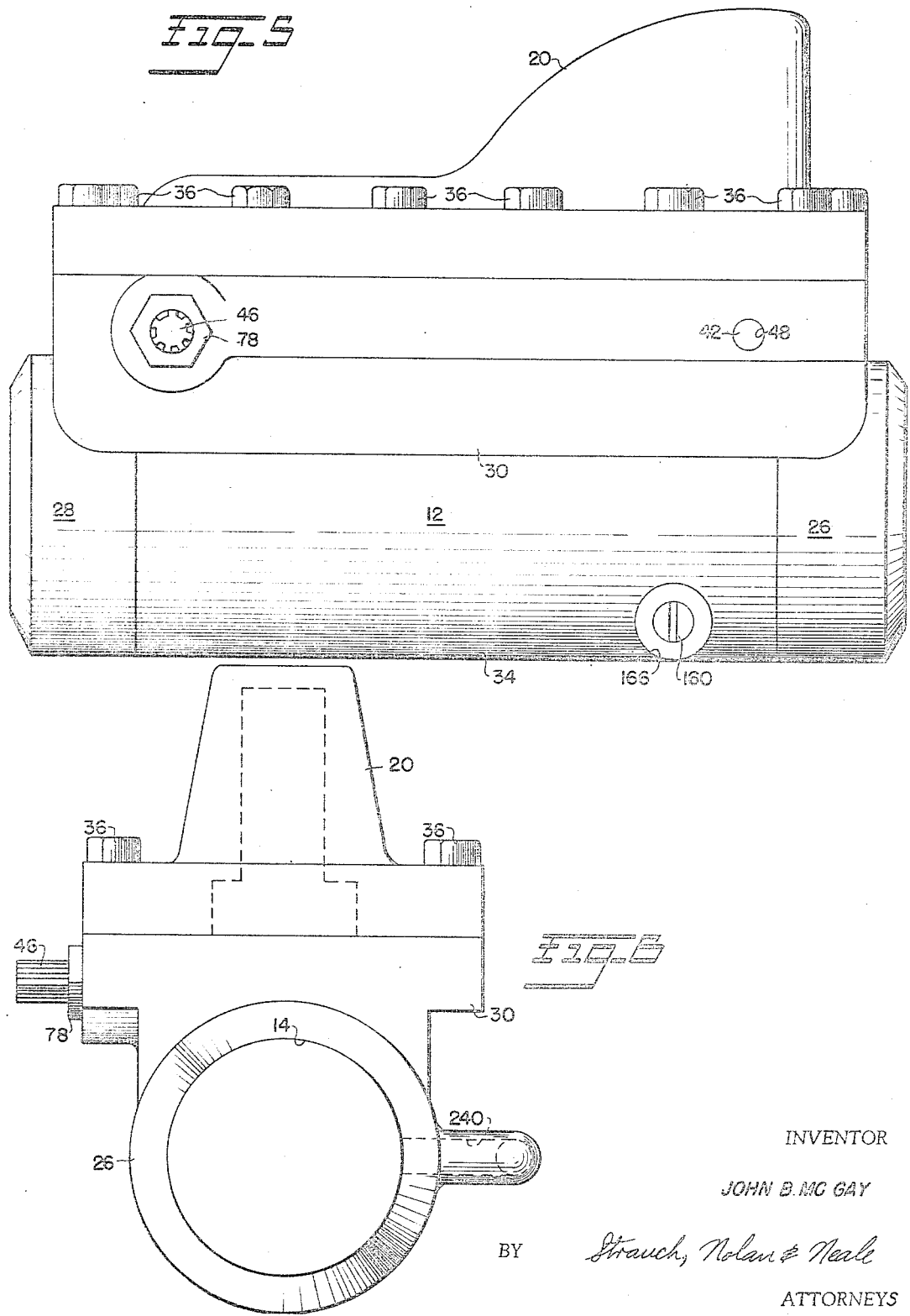

Jan. 23, 1968
J. B. McGAY
3,364,944
VALVE
Filed Feb. 5, 1965
5 Sheets-Sheet 4
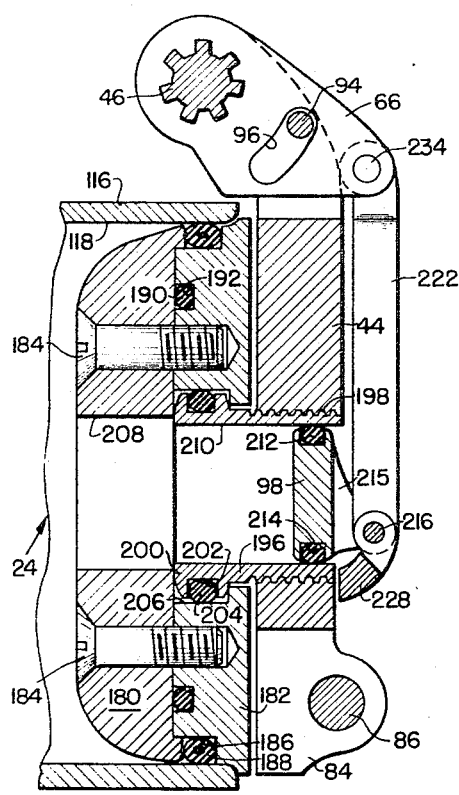
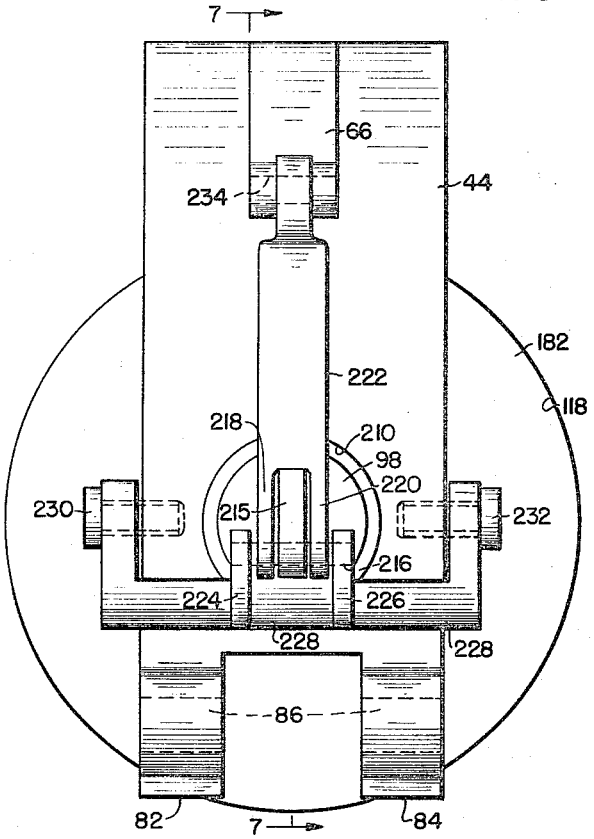
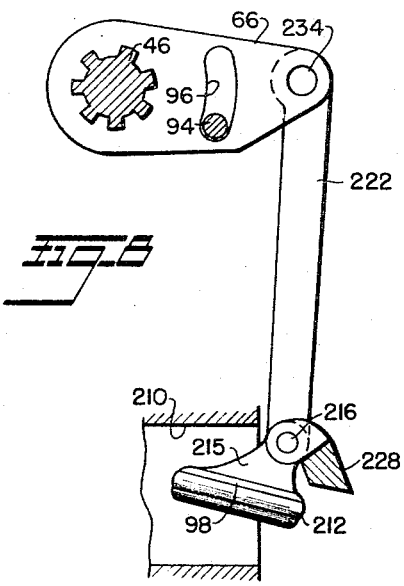
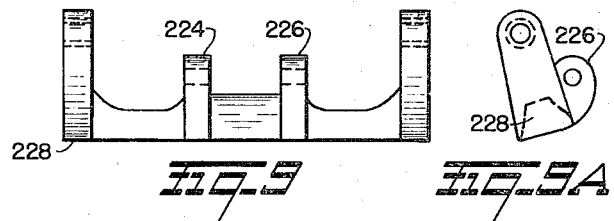
INVENTOR
JOHN B. MC GAY
BY Strauch, Nolan & Neale
ATTORNEYS Jan. 23, 1968   J. B. McGAY   3,364,944
VALVE
Filed Feb. 5, 1965   5 Sheets-Sheet 5

INVENTOR
JOHN B. McGAY

BY   *Strauch, Nolan & Neale*
ATTORNEYS

United States Patent Office 3,364,944
Patented Jan. 23, 1968

3,364,944
VALVE
John B. McGay, 1551 S. Yorktown Place,
Tulsa, Okla. 74104
Filed Feb. 5, 1965, Ser. No. 430,682
16 Claims. (Cl. 137—614.11)

ABSTRACT OF THE DISCLOSURE

A straight through flow passage, swinging gate valve with double gates seating on aligned ports. The gates are subjected to upstream and downstream pressures are interconnected for conjoint actuation and when open will swing up and out of the through flow path. Control mechanism actuates a valve to vary the differential pressure across one of the valve gates to disrupt the balancing effect of pressure differentials across the two gates to enable opening and closing of the valve with minimum effort.

BACKGROUND OF THE INVENTION

The present invention relates to improvements in valve structures and valve actuating arrangements. More particularly, the present invention relates to the provision of a through opening swing gate type valve providing both upstream and downstream seals.

Swinging gate valves of the through opening type as heretofore constructed have provided but a single seal. My prior Patents No. 3,062,232, dated Nov. 6, 1962, for Combination Two Direction Check and Gate Valve, and No. 3,084,904, dated Apr. 9, 1963, for Swinging Gate Valves, illustrate such prior constructions. Double door swinging gate valves per se are known, as is shown for example by United States Patent No. 1,483,390, dated Feb. 12, 1924, to B. S. Snow for Valve Mechanism, but such prior constructions are not suitable for pipeline use at the present time.

For certain application, such as pipeline use, the provision of both an upstream and a downstream seal, preferably with the facility for bleeding the chamber intermediate the upstream and downstream seals so that complete isolation of the upstream and downstream sides of the line is readily demonstrable, is now practically mandatory. The provision of a swinging gate valve having these characteristics and features while maintaining a through opening permitting pigging of the pipeline is therefore one of the primary objects of this invention.

Basically, this valve provides a full flow to positive shutoff control for gas, oil or water pipelines or for product lines. The valve may be opened or closed by controlled application of the flowing differential pressures in the line across either the inlet door or the outlet door so that little external effort is required to operate it.

A further important object of the present invention is therefore the provision of a valve having both upstream and downstream seals and in which the difference in differential pressure across the upstream and across the downstream valve closure members is selectively controllable in such a manner that the force necessary for valve opening and closure movements is derived from the line fluid rather than from an external source.

Other important individual and combinational features and objects of the present invention are to provide:

(1) A valve having both upstream and downstream seals and in which the power requisite to effect opening and closing movements of the valves is derived by selective variation of the relative magnitude of the differential pressure across the upstream and downstream seats by adjustment of the size of a bleed passage through the downstream valve closure member;

(2) A through opening swinging gate valve having both upstream and downstream seals;

(3) A full opening straight through flow valve through which a cleaner or "pig" may be passed;

(4) A valve with an external operating handle operated through less than 120 degrees with very little effort required to open or close even with high line pressures and in which preferably, the handle position serves to indicate the valve position;

(5) A double door or swinging gate valve with inlet and outlet doors or gates synchronously connected so that, when the valve is partially open, the differential pressure across the two sides of one door or gate approximately balances that across the two sides of the other door;

(6) A double door or swinging gate valve with a controllable by-pass through or around each door or gate, the inlet by-pass being normally pre-set manually and the by-pass through the outlet door being operable by a valve operating handle or member to cause the differential drop across the whole valve to provide the power to open or close the valve as the handle or member is moved;

(7) A double door or swinging gate valve with a central or neutral chamber between the two doors or gates having means for locking the two doors or gates in closed position and a drain cock to release central chamber pressure to atmosphere to thereby permit demonstration that absolutely now flow can occur between the inlet and the outlet sides of the valve;

(8) A valve construction wherein all working parts of valve are readily replaceable without removing the body of the valve from the line;

(9) A valve construction with self-aligning seats and closure doors allowing large tolerances in production and also thereby enabling a fabricated body of comparatively light and economical construction and moreover providing a body in which distortion due to pressure does not affect ability to operate and close off the valve;

(10) A valve body having an internally sealing self-aligning valve seat mounting construction;

(11) A resiliently peripherally gasketed valve closure member adapted for internal seating within a cylindrical valve seat and radial floating motion with respect to the valve actuating member upon which it is mounted;

(12) A through passage equipped valve closure member and valve actuating member assembly in which the valve closure member has limited radial float and canting movement with respect to the valve actuating member to permit self-alignment thereof with respect to its valve seat;

(13) A through ported valve closure member equipped with a butterfly valve, preferably articulated externally of the port, for controlling the effective cross-sectional area of the port through the valve member;

(14) A through opening swinging gate valve providing both upstream and downstream seals in which line pressure is normally utilized to effect valve opening and closing movements and in which the valve members may be locked in their closed positions and the chamber intermediate the valve members isolated by positively maintained seals at both the upstream and downstream side of the valve assembly to permit bleeding of the pressure and draining of fluid from such chamber.

These and other objects of the present invention will become more fully apparent by reference to the appended claims and as the following detailed description proceeds in reference to the accompanying scale drawings wherein:

FIGURE 1 is a vertical section through a valve constructed in accord with the principles of the present invention illustrating the valve members or valve closure members in their closed positions;

FIGURE 2 is a top plan view, partially in section, showing the valve construction of FIGURE 1 with the cover removed;

FIGURE 3 is a fragmentary sectional view taken substantially along the line 3—3 of FIGURE 1;

FIGURE 4 is a view similar to FIGURE 1 illustrating the configuration of the valve mechanism when the valve closure members are in their fully open position;

FIGURE 5 is a side elevational view of the assembly of FIGURE 1;

FIGURE 6 is a right end view of the structure shown in FIGURE 5;

FIGURE 7 is a fragmentary view, partially in section, illustrating the downstream valve closure member and its associated control linkage;

FIGURE 8 is a fragmentary view illustrating the control linkage for the downstream valve member with the butterfly valve thereof in its fully open position;

FIGURES 9 and 9A are respectively plan and end views of one of the links of the mechanism shown in FIGURE 8;

FIGURE 10 is a right end view of the structure shown in FIGURE 7; and

Figure 11:
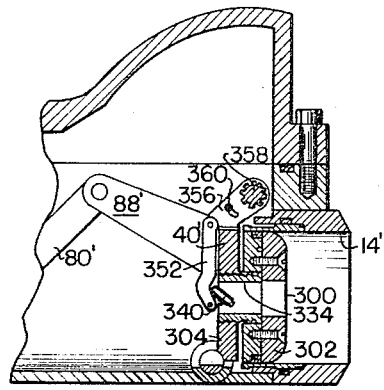
FIGURES 11–16 illustrate an alternative embodiment of the invention wherein the upstream by-pass is incorporated in the upstream gate and is externally linked to the downstream by-pass, FIGURES 11–14 corresponding to FIGURES 1, 2, 4, and 5 of the first embodiment and FIGURES 15 and 16 being enlarged details of the upstream by-pass valve and its operating linkage.

Referring now to the drawings and particularly to FIGURES 1 and 5, the valve assembly of the present invention comprises, basically, a valve body 12 providing an inlet port 14, an outlet port 16 and a central chamber 18, a cover plate 20, and upstream and downstream valve members 22 and 24 which, in their closed positions as illustrated in FIGURE 1, block passage through the ports 14 and 16 respectively.

The valve body 12 is made up of three castings 26 and 28 (which provide the inlet and outlet ports 14 and 16), 30 (which defines the top opening 32 of the chamber 18) and the wrap around part of sheet steel 34, the configuration of which is best illustrated in FIGURE 3. The parts 26, 28, 30 and 34 are welded together in fluid tight relation to form an open top pressure tight valve body. The cover plate 20 is fixed to the body casting 30 by suitable machine screws 36. A deformable gasket 38 received within a groove in the upper face of the casting 30 and extending about the opening 32 is compressed between the cover plate 20 and the casting 30 to provide a fluid tight seal therebetween and thus complete the enclosure of the valve body chamber 18.

Referring to FIGURES 1 and 2, the upstream valve closure member 22 is mounted upon a valve actuating member 40 which is pivotally mounted upon a shaft 42 mounted on the casting 30 of the valve body 12.

The downstream valve closure member 24 is mounted upon a valve actuating member 44 which is journalled upon a shaft 46 also supported by the casting 30 of the valve body 12.

As is apparent from FIGURE 2, shaft 42 extends through a journal 48 in the casting 30, through an aligned bore 50 in the valve actuating member 40 and into a blind bore 52 in the casting 30. The fluid tight integrity of the chamber 18 is maintained by an O-ring seal 54 surrounding the shaft 42 within the bore 48.

The shaft 46 upon which the downstream valve actuating member 44 is journalled extends through counterbore 56, bore 58, the bore 60 in the arm 62 of the valve actuating member 44, and internally splined aperture 64 in a member 66, a bore 68 in the arm 70 of the valve actuating member 44 into a blind bore 72 in the valve body casting 30. A O-ring seal 74 received within the counterbore 56 between its end wall and the opposed radial face of the enlarged portion 76 of the shaft 46 establishes a fluid tight seal between the shaft 46 and the casting 30 to prevent fluid leakage from the chamber 18. The shaft 46 is axially retained in the casting 30 by an apertured retainer nut 78 threaded in the outer end of the counterbore 56 and extending axially along the shaft 46 to abut the enlarged portion 76 thereof. By this construction, the valve actuating member 44 is pivotally mounted upon the shaft 46 whereas the member 66, the function of which will be explained presently, is splined to shaft 46 for pivotal motion therewith. The outer end of the shaft 46 is splined as shown in FIGURE 2 to receive a suitable valve control handle or member (not shown).

Referring now to FIGURES 1, 2 and 3, the valve actuating members 40 and 44 are interconnected by a link 80. Link 80 extends between the depending arms 82 and 84 of valve actuating member 44 and is pivotally connected thereto by a pin 86. Link 80 extends between the arms 87 and 88 of the downstream projection 90 of the valve actuating member 40 and is pivotally connected thereto by a pin 92.

The axes of the shafts 42 and 46 are parallel. The axes of pins 86 and 92 are parallel and parallel to the axes of the shafts 42 and 46. As is apparent from FIGURES 1 and 4, the plane defined by the axes of the pins 86 and 92 intersects the plane defined by the axes of the shafts 42 and 46 in a line lying between the axes of the shafts 42 and 46 in all adjusted positions of the valve actuating members 40 and 44.

The two valve closure members or doors 22 and 24 are thus connected so that their opening and closing rates are nearly synchronous from the closed position as illustrated in FIGURE 1 to a point about 45 degrees open. After the valve members pass that point, their rates vary from synchronous to some extent but not enough to affect operation. Each of the valve members 22 and 24 is free swinging on its pivot but the downstream valve actuating member 44 for the valve member 24 is connected to the member 66 which is splined to the shaft 46 by a motion limiting pin 94 which is fixed between the arms 62 and 70 of the valve actuating member 44 and extends through an arcuately elongated slot 96 in the member 66 so that when the handle or valve control member (not shown) fixed to the shaft 46 externally of the casting 30 is moved, the member 66 is moved through a limited travel and then torque is applied to the valve actuating member 44 and the valve closure member 24 and through the link 80 to the valve actuating member 40 and the upstream valve closure member 22. This torque applied to the upstream and downstream valve closure members 22 and 24 is in no way intended to be sufficient to open or close the valve closure members against line pressure but merely serves to lift their dead weight to their fully opened position as shown in FIGURE 4 or to bring them down into position for closing. The actual opening and closing of the valve closure members 22 and 24 is performed by the differences in differential pressure across the two sides of the valve closure members 22 and 24, this difference in differential pressure being set up by the action of the variable bypass valve 98 through the downstream valve closure member 24 under control of the member 96 as will be explained presently. The valve seats form both the upstream and the downstream valve closure members 22 and 24 and are of the internal sealing type as generally disclosed in my aforesaid United States Patent 3,062,232, but are of an improved self-aligning design. These valve seat constructions are best illustrated in FIGURE 4.

The seat for the upstream valve closure member 22 is formed by the cylindrical interior surface 102 of a sleeve 100 which is received within the counterbore 104 in the casting 26 coaxial with the inlet passage 14. The sleeve 100 is retained within the bore 104 by a U-shaped spring retainer clip 106 and a U-shaped abutment 108 fixed to the shell 34 as by welding. An annular groove 110 is formed in the side wall of the counterbore 104 in spaced relation to the end thereof. In alignment with the annular groove 110, the exterior surface of the sleeve 100 is formed with an annular shoulder 112 of but slightly smaller diameter than the diameter of the counterbore 104, an O-ring 114 being received within the annular groove 110 and deformed between the shoulder 112 and the walls of the groove 110 to form a fluid tight seal between the sleeve 100 and the casting 26. Over the remaining portion of its length within the counterbore 104, the exterior surface of the sleeve 100 has a diameter which is substantially less than the diameter of the counterbore 104 so that the sleeve 100 can cant with respect to the axis of the inlet port 14 for self-alignment with respect to the valve closure member 22 without interrupting the fluid tight seal between the sleeve 100 and the casting 26 provided by the O-ring 114.

The downstream valve closure member 24 is provided with a seat within the outlet passage 16 in the casting 28 which is of similar construction to that previously described. This seat is formed by the internal cylindrical surface 116 of a sleeve 118 retained within a counterbore 120 in the casting 28 by a spring clip 122 and a U-shaped retainer ring 124 welded within the member 34. The configurations of the members 122 and 124 are best illustrated in FIGURE 3. Sleeve 116 has an annular shoulder 126 co-operating with an O-ring 128 in an annular groove 130 in the side wall of the counterbore 120 to form a fluid tight seal between the sleeve 116 and the casting 28. The exterior surface of the sleeve 116 at each side of the annular shoulder 126 is of lesser diameter than the diameter of the counterbore 120 so that the sleeve 116 is free to cant with respect to the axis of the outlet passage 16 to effect self-alignment with respect to the downstream valve closure member 24.

The construction of the upstream valve closure member 22 and its connection to the valve actuating member 40 is best illustrated in FIGURE 1. The upstream valve closure member 22 comprises a pair of disks 132 and 134 connected together by machine screws 136. The disks 132 and 134 provide a peripheral annular groove 138 in which is received an internally circumferentially reinforced O-ring 140 which, when the valve closure member 22 is in its closed position as illustrated in FIGURE 1, co-operates with the internal surface 100 of the valve seat sleeve 102 to seal the connection between the inlet passage 14 and the chamber 18 through the sleeve 102. A further O-ring 142 deformed between the abutting faces of the disks 132 and 134 and received within an annular groove in the disk 134 provides a fluid tight seal between the two disks 132 and 134.

The valve closure member 22 is mounted for limited canting motion with respect to the valve actuating member 40 and for limited radial float relative to the axis of the inlet passage 14. For this purpose, the disk 134 is provided with a through bore 144 and a counterbore 146. A connector member 148 having a head 150 and a threaded shank 152 is the member which interconnects valve closure member 22 with the valve actuating member 40. The head 150 has a conoidal end surface and a peripheral groove in which is received an O-ring 154. The conoidal end surface of the head 150 abuts the adjacent surface of the disk 132. The head 150 and the O-ring 154 are received within the counterbore 146, the O-ring engaging the cylindrical wall of the counterbore 146 to resiliently center the head 150 therein to permit relative radial float between the disk 134 and the head 150. The shank 152 within the bore 144 is of lesser diameter than the bore 144 so that limited canting motion of the valve closure member 22 with respect to the shank 152 may take place to permit alignment of the valve closure member 22 and the valve seat forming sleeve 102.

The valve closure member 22 and its valve actuating member 40 can be locked in their closed positions by rotation of a shaft 160 which extends transversely of the chamber 18, and is journalled with respect thereto within a tubular sleeve 162 projecting through aligned apertures 164 and 166 in the sheet metal member 34 as is apparent from FIGURES 1 and 5. The central portion of the sleeve 162 is cutaway at 168 so that the sleeve 163 does not interfere with the motion of the valve actuating member 40. The shaft 160 has a central cutout at 170. So long as the shaft 160 is in the position illustrated in FIGURE 1, it will not interfere with the pivotal motion of the valve actuating member 40. When the shaft 160 is rotated 180 degrees, it engages an arcuate surface 172 on the bottom end of the valve actuating member 40 to hold the valve actuating member 40 and the valve closure member 22 in their closed positions mechanically.

As will become apparent presently, by locking the valve closure member 22 in its closed position mechanically by rotating the shaft 160 as just described, upstream and downstream seals are provided in the inlet passage 14 and the outlet passage 16 respectively permitting bleeding of the fluid pressure within the chamber 18.

The structure and the mounting of the downstream valve closure member 24 is best illustrated in FIGURES 7 and 10. The downstream valve closure member 24 is formed by a pair of disks 180 and 182 interconnected by screws 184, providing an annular groove 186 retaining an internally reinforced O-ring 188 and maintained in relative fluid tight relation by an O-ring 190 deformed within an annular groove 192 in the face of the disk 182 adjacent the disk 180. The O-ring 188 engages the cylindrical interior surface 118 of the downstream valve seat forming sleeve 116 when the valve closure member 24 is in its closed position to establish a fluid tight seal therebetween.

The valve closure member 24 is supported upon the valve actuating member 44 for limited radial floating motion and limited canting motion by a member 196. Member 196 is fixed to the valve actuating member 44 by threads at 198. Member 196 has an enlarged head 200 formed with a peripheral groove 202 in which is received an O-ring 204. The head 200 with its O-ring 204 are received within a counterbore 206 in the disk 182, the head 200 being sufficiently smaller than the annular recess provided by the counterbore 206 and the disk 180 to permit limited canting motion of the member 196 with respect to the disks 182 and 180 and limited radial floating motion relative thereto. The O-ring 204 is slightly deformed within the groove 202 and against the cylindrical wall of the counterbore 206 so that it provides a fluid seal between the member 196 and the disk 182 and resiliently biases the disks 180 and 182 to a position in coaxial alignment with the member 196.

The disk 180 and the member 196 are formed with through apertures 208 and 210 of substantially equal diameter and in substantial coaxial alignment so that apertures 208 and 210 establish a passage through the valve closure member 24 and the valve actuating member 44. It is within the aperture 210 that the valve member 98, previously referred to, is disposed.

As is apparent from a comparison of FIGURES 7 and 8, valve member 98 is a butterfly type valve which is peripherally gasketed by an O-ring 212 retained within an annular groove 214. When the valve member 98 is in its closed position as illustrated in FIGURE 7, the O-ring 212 is deformed to form a fluid tight seal against the cylindrical surface forming the passage 210.

Valve member 98 differs primarily from conventional type butterfly valves in that it is articulated exteriorly of the passage 210 which it is adapted to seal. This structure is best illustrated in FIGURES 7 and 10. Valve member 98 is formed with an arm 214 extending to the right as viewed in FIGURE 7 which is splined to a shaft 216. Shaft 216 extends pivotally through the spaced arms 218 and 220 of a depending link 222 and is splined at its outer ends to a pair of lugs 224 and 226 formed integrally with a transversely extending pivot member 228. The pivot member 228 is pivotally mounted on a pair of studs 230 and 232. The axis of pivot studs 230 and 232 extends diametrically of the passage 210 so that, when the member 228 and the valve closure member 98 are pivoted from their closed position as illustrated in FIGURES 7 and 10 to their open position as illustrated in FIGURE 8, the valve closure member 98 pivots about a diameter in the same manner as conventional butterfly valves, even though it is pivoted externally of the passage 210.

The member 222 is pivotally connected through a shaft 234 to the member 66 which is splined to the shaft 46.

As is apparent from a comparison of FIGURES 7 and 8, the pivotal motion of the valve member 98 within the aperture 210 is dependent upon the relative position of the members 44 and 66, the limits of relative travel of which are determined by the limit positions of the pin 94 within the arcuate slot 96. For example, if, with the mechanism in the configuration as illustrated in FIGURE 7, the shaft 46 is rotated in a counterclockwise direction, the member 66 will pivot in a counterclockwise direction thereby moving the arcuate slot 96 upwardly until the pin 94 lies at the opposite end of the slot 96 as illustrated in FIGURE 8. Thereafter continued counterclockwise rotation of the shaft 46 will produce concomitant counterclockwise rotation of both the members 66 and the valve actuating 44. This is the action that takes place when the valve is being opened in the absence of line pressure.

If while the valve member 98 is in its opened position as illustrated in FIGURE 8, the valve actuating member 44 moves in a counterclockwise direction about the axis of the shaft 46 without any movement of the member 66, the valve member 98 will pivot toward its closed position. The same action will of course take place if, with the valve actuating member 44 stationary, the member 66 is pivoted in a clockwise direction.

The valve member 98 and the passage defined by apertures 208 and 210 thus provide a selectively controllable bypass passage through the downstream valve closure member which may be utilized to control the differential pressure across the downstream valve closure member to open or close the valve under the influence of line pressure as will be explained presently.

As is apparent from FIGURES 2 and 6, a bypass passage 240 extends from the inlet passage 14 to the chamber 18 around the upstream valve closure member 22. Interposed in this passage is a rotatable angle valve 242 having a passage 244 which, in the position illustrated in FIGURE 2 is effective to establish a direct connection through the passage 240 between the inlet passage 14 and the chamber 18 and when rotated 90 degrees in a clockwise direction as viewed in FIGURE 2 to terminate that connection and directly vent the chamber 18 to atmosphere through the outlet 246.

It will thus be noted that a bypass passage is provided through or around both the upstream and the downstream valve closure members 22 and 24. The bypass around the upstream valve closure member 22 must, for optimum operating conditions, have an effective flow area of about 1% of the size of the passage defined by valve seat sleeve 102. The bypass passage through the downstream valve closure member 24 when the valve member 98 in its fully opened position should have a minimum open area of about 4% of the area of the downstream outlet passage as defined by the donwstream valve seat 116.

OPERATION

The shaft 46, as previously indicated is equipped exteriorly of the valve with an operating member (not shown). This operating member is preferably in its upright position when the valve is closed as shown in FIGURE 1.

With the valve closed as shown in FIGURE 1, and the valve 242 in its open position as shown in FIGURE 2, the fluid pressure within chamber 18 is the same as inlet pressure within the inlet passage 14 and the downstream pressure in the outlet passage 16 may have any value down to atmospheric pressure. If shaft 46 is moved in a counterclockwise direction, bypass valve 98 starts to open and there is fluid flow from the chamber 18 into the outlet passage 16 through the passage defined by apertures 208 and 210. When the bypass valve member 98 is opened enough that its flow area is greater than the flow area through the bypass passage 240, then the pressure in the chamber 18 will start to drop below the pressure in the inlet passage 14, thus creating a pressure differential across the upstream valve closure member 22. This differential pressure across the upstream valve closure member 22, through the link 80, the shaft 46 and the valve actuating member 44 exerts a counterclockwise valve opening torque upon the downstream valve closure member 24. The differential pressure across the downstream valve closure member 24 of course drops as the pressure within the chamber 18 drops so that, when the differential pressure across the downstream valve closure member 24 is less than that across the upstream valve closure member 22, both valve closure members 22 and 24 move toward their open positions as illustrated in FIGURE 4 without the application of turning torque to the shaft 46. The opening action of the valve closure members 22 and 24 in response to differences in differential pressure across them will be a controlled opening in that, if the shaft 46 is held stationary as the valve closure members 22 and 24 start to open, bypass valve 98 will close slightly thus tending to retard the opening process and acting as a throttling valve. As the shaft 46 is further moved in a counterclockwise direction, the valve closure members 22 and 24 will continue to open until they are out of the path between the valve seats 102 and 116 and no differential pressure between the inlet passage 14 and the chamber 18 and between the chamber 18 and the outlet passage 16 exists.

When the valve is wide open as shown in FIGURE 4 and it is desired to close the valve, the shaft 46 is rotated in a clockwise direction to lower the valve closure members 22 and 24 into the stream of fluid flow between the valve seats 100 and 116 and in so doing set up differential pressures. If the bypass valve member 98 is open, then the differential pressure across the upstream valve closure member 22 will be greater and as the shaft 46 is rotated further in a clockwise direction, bypass valve member 98 will tend to close due to the resistance to rotation in a clockwise direction of the downstream valve actuating member 44 established by the higher differential pressure across the upstream valve closure member 22. As the bypass valve member 98 is closed, bypass passage 240 remaining open, the differential pressure across the downstream valve closure member 24 will rise and exceed that across the upstream valve closure member 22. So long as the differential pressure across the downstream valve closure member 24 exceeds that across the upstream valve closure member 22, the valve closure members 22 and 24 will tend to close. If the shaft 46 is rotated in a clockwise direction at a uniform rate, the valve closure members 22 and 24 cannot slam shut because each increment of closing motion of the valve closure members 22 and 24 faster than the rotation of the shaft 46 causes the bypass valve member 98 to open slightly thereby reducing the differential pressure across the downstream valve closure member 24 and tending to check the rapid closing motion of the valve closure members 22 and 24.

As is apparent to those skilled in the art, the positioning of shaft 46 may be through spur gearing or worm gearing, may be controlled manually or by power through a diaphragm linkage, a hydraulic cylinder linkage, a geared motor or any other suitable means. The important aspect of this invention is that even with very large size valves and high pressures, very little power is required to rotate the shaft 46 in either its closing direction or its opening direction since the line fluid is utilized as a primary source of motive power to effect valve opening and closure movements and the same is true of the second embodiment, now to be described.

MODIFICATION

In the second embodiment, illustrated in FIGURES 11–16, the difference over the first embodiment is that the upstream or inlet by-pass is incorporated into and goes through the inlet gate rather than being around the gate. The provision of two by-pass valves, one in each main gate, working in opposite direction from each other provides a much closer control, particularly with smaller size valves.

To accomplish this construction, the downstream gate 24' is made exactly like the downstream gate 24 seen in FIGURE 1 and the upstream or inlet gate 300 seen in FIGURES 11–13 and 15 will have a small central by-pass valve arranged in a construction similar to the downstream gate 24' except that the inlet by-pass valve will be opened when inlet gate 300 is closed.

Figure 15:
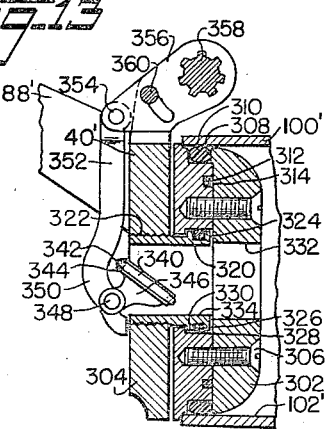
Figure 14:
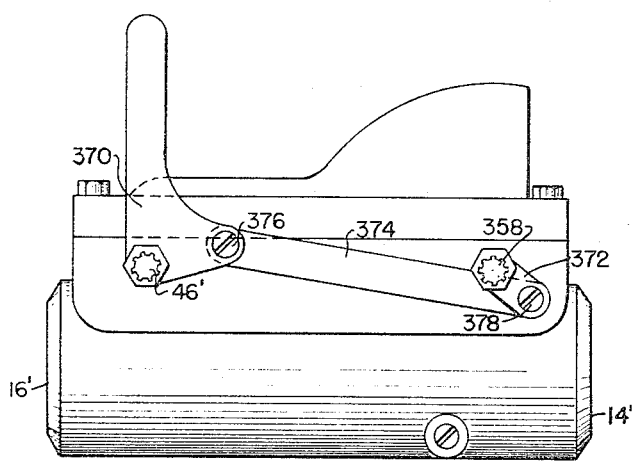

The structure and the mounting of the modified upstream valve closure member 300 are best illustrated in FIGURES 11 and 15. The valve closure member 300 is formed by a pair of disks 302 and 304 interconnected by screws 306, providing an annular groove 308 retaining an internally reinforced O-ring 310. The two disks are maintained in relative fluid tight relation by an O-ring 312 deformed within an annular groove 314 in the face of disk 304 adjacent disk 302. O-ring 310 engages cylindrical interior surface 102' of the upstream valve seat forming sleeve 100' when the valve closure member 300 is in its closed position and establishes a fluid tight seal therebetween.

Valve closure member 300 is supported upon its actuating member 40' for limited radial floating motion and limited canting motion by a member 320 which is fixed to valve actuating member 40' by threads at 322. Member 320 has an enlarged head 324 formed with a peripheral groove 326 in which is received an O-ring 328. Its head 324 with O-ring 328 is received within a counterbore 330 in the disk 304, the head 324 being sufficiently smaller than the annular recess provided by the counterbore 330 and disk 302 to permit limited canting motion of the member 320 with respect to the disks 302 and 304 and limited radial floating motion relative thereto. The O-ring 328 is slightly deformed within the groove 326 and against the cylindrical wall of the counterbore 330 so that it provides a fluid seal between the member 320 and the disk 304 and resiliently biases the disks 302 and 304 to a position in coaxial alignment with the member 320.

The disk 302 and member 320 are formed with through apertures 332 and 334 of substantially equal diameter and in substantial coaxial alignment so that apertures 332 and 334 establish a passage through the valve closure member 300 and the valve actuating member 40. Within aperture 334 a by-pass valve member 340 is disposed.

Figure 16:
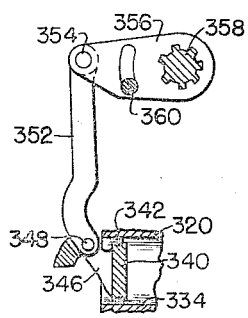

FIGURES 15 and 16 show that valve member 340 is a butterfly type valve which is peripherally gasketed by an O-ring 342 retained within an annular groove 344. When the valve member 340 is placed in its closed position the O-ring 342 is deformed to form a fluid tight seal against the cylindrical surface forming the passage 334.

Valve member 340, like the downstream by-pass valve member 98 seen in FIGURE 7, is articulated exteriorly of the passage 334 within which it is adapted to seal. Similar structure is best illustrated in connection with FIGURES 7 and 10 of the first embodiment. Valve member 340 is formed with an arm 346 extending to the left as viewed in FIGURE 15 which is splined to a shaft 348. Shaft 348 extends pivotally through the forked end 350 of a depending link 352 and is splined at its outer ends to a pair of lugs formed integrally with a transversely extending pivot member which is pivotally mounted on a pair of studs, similar to pivot member 228 on the downstream gate (see FIGURE 10). The axis of the pivot studs extends diametrically of the passage 334 so that, when the pivot member and the valve closure member 340 are pivoted from their opened position as illustrated in FIGURES 11 and 15 to their closed position, the valve closure member 340 pivots about a diameter in the same manner as conventional butterfly valves, even though it is pivoted externally of the passage 334.

The link member 352 is pivotally connected through a pin 354 to a lever member 356 which is splined to an operating shaft 358. The upstream gate actuating member 40' is pivotally hung on splined operating shaft 358 and is interconnected to lever member 356 with a lost motion connection similar to that which has been described for the downstream valve member 44.

As is apparent from a comparison of FIGURES 15 and 16, the pivotal motion of the valve member 340 within the aperture 334 is dependent upon the relative position of the members 40' and 356, the limits of relative travel of which are determined by the limit positions of the pin 360 within the arcuate slot 362. For example, if, with the mechanism in the configuration as illustrated in FIGURE 15, the shaft 358 is rotated in a clockwise direction, the member 356 will pivot in a clockwise direction thereby moving the arcuate slot 362 upwardly until the pin lies at the opposite end of the slot 362 as illustrated in FIGURE 16. Thereafter continued clockwise rotation of the shaft 358 will produce concomitant clockwise rotation of both the valve operating member 356 and the valve actuating member 40'.

If while the valve member 340 is in its closed position as illustrated in FIGURE 16, the valve actuating member 40' moves in a clockwise direction about the axis of the shaft 46 without any movement of the lever member 356, the valve member 340 will pivot toward its opened position. The same action will of course take place if, with the valve actuating member 40' stationary, the lever member 356 is pivoted in a counterclockwise direction.

The valve member 340 and the passage defined by apertures 332 and 334 thus provide a normally open by-pass passage through the upstream valve closure member, a construction which may be utilized in lieu of the by-pass conduit 240 and valve 242 seen in FIGURE 2.

In this second embodiment the upstream valve actuating member has an arm 88' pivotally connected through a link 80' to the downstream actuating member identical to that shown in FIGURE 1. However, in this second embodiment there are two operating shafts 46' and 348 and the two are interconnected externally by an articulated direction reversing linkage consisting of lever 370 splined on and secured to the end of shaft 46', a lever 372 splined on and secured to the end of shaft 348 and an interconnecting link 374 secured at each end by screw pivot connections 376 and 378 to levers 370 and 372, respectively. An operating handle 380 is integral with lever 370 but could just as well be integral with lever 372.

OPERATION OF SECOND EMBODIMENT

Figure 13:
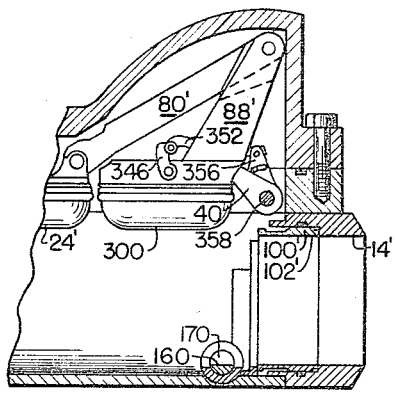
Figure 12:
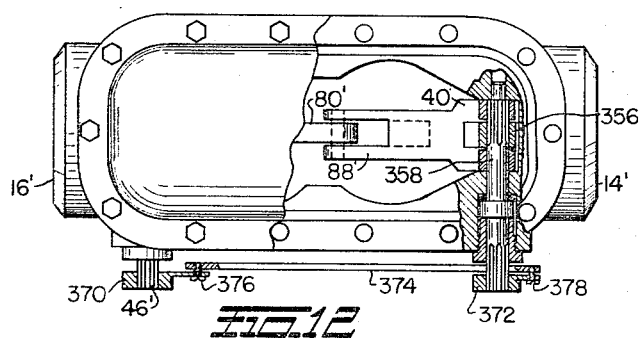

With the valve closed as shown in FIGURE 11, upstream by-pass valve 340 is in its open position and the fluid pressure within the main chamber 18' is the same as inlet pressure within the inlet passage 14'. Downstream pressure in the outlet passage 16' may have any value down to atmospheric pressure or even below that. If shaft 46' is moved in a counterclockwise direction, the downstream by-pass valve starts to open while upstream by-pass valve 340 is still open and there will be fluid flow from the chamber 18' into the outlet passage 16' through the passage opened by the downstream by-pass valve. When the downstream by-pass valve member is opened enough that its flow area is greater than the flow area through the upstream by-pass passage which is being closed by the linkage, then the pressure in the chamber 18' will start to drop below the pressure in the inlet passage 14', thus creating a pressure differential across the upstream valve closure member 300. This differential pressure across the upstream valve closure member 300, through the link 80' the shaft 46' and the downstream valve actuating member 44' exerts a counterclockwise valve opening torque upon the downstream valve closure member. The differential pressure across the downstream valve closure member of course drops as the pressure within the chamber 18' drops so that, when the differential pressure across the downstream valve closure member is less than that across the upstream valve closure member 300, both of the main valve closure members move toward their open positions as illustrated in FIGURE 13 without the application of turning torque to the shaft 46'. The opening action of the main valve closure members in response to differences in differential pressure across them will be a controlled opening in that, if the shaft 46' is held stationary as the main valve closure members start to open, the downstream by-pass valve 98 will close slightly while the upstream by-pass valve 340 will open slightly thus tending to retard the self opening process and acting as a throttling valve. As the shaft 46' is further moved in a counterclockwise direction, the downstream and upstream valve closure members will continue to open until they are out of the path between the valve seats and no differential pressure between the inlet passage 14' and the chamber 18' and between the chamber 18' and the outlet passage 16' exists.

Closure is substantially the reverse of opening as will be apparent to those skilled in the art. In operation of this second embodiment, if it were desired to test by opening the center chamber, the valve would be closed normally, and the upstream gate lock then turned in place. Then the exterior articulating link would be disconnected from the left hand operator and the by-pass thru the upstream gate placed in its closed condition. Then the chamber could be opened to atmosphere.

If it is desired to utilize either embodiment of the double door gate valve disclosed in this application as a check valve, that can be readily accomplished by placing a small check valve in the passage 240 of the first embodiment or placing a flap type check valve in the passage 332 of the upstream gate in the second embodiment. In each instance, such a check valve will act to prevent back flow from the chamber 18 to the inlet passage 14 in a counterclockwise direction to hold the downstream by-pass valve 98 normally in a slightly opened position. With these modifications, the valve will have free flow from right to left as viewed in FIGURES 1 and 11 but will serve as a check valve on any back flow from the outlet passage 16 toward the inlet passage 14.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A valve comprising:
   (a) a valve body having a pair of aligned apertured valve seats having openings of like cross-sectional area, inlet and outlet passages leading thereto and a chamber interposed therebetween;
   (b) a pair of valve members, each mounted for opening and closing movements within said chambers with respect to one of said seats;
   (c) means defining a first bleed passage from one side to the other side of the upstream one of said seats having an effective minimum cross-section less than that of the openings through the upstream seat;
   (d) means defining a second bleed passage through the valve member cooperating with the downstream seat and having an effective cross-sectional area intermediate that of said first bleed passage and that of the openings through said valve seats;
   (e) means interconnecting said valve members so that the result of any differential pressure across either of said valve members tending to impart opening or closing movements thereto is transmitted to the other of said valve members to tend to impart like movement thereto; and
   (f) means for selectively controlling the effective size of said second bleed passage with respect to that of said first bleed passage;
whereby said members may be moved concomitantly between their open and closed positions by varying the size of said second bleed passage while line pressure is applied to said valve.

2. The valve defined in claim 1 wherein the open positions of said valve members are outside of the portion of said chamber between said seats so that fluid flow through said chamber from the upstream to the downstream seat is unobstructed.

3. The valve defined in claim 1 wherein means are provided for mechanically locking said valve members in their closed positions, and wherein means are provided for closing the connection of said first bleed passage to the upstream side of said upstream valve seat and for bleeding the pressure from said chamber.

4. A valve comprising:
   (a) a valve body having a pair of aligned cylindrically apertured valve seats having openings of like cross-sectional area, inlet and outlet passages leading thereto and a chamber interposed therebetween;
   (b) a pair of peripherally resiliently gasketed valve members;
   (c) a pair of valve actuating members mounting each of said valve members for limited radial float and for movements within said chamber with respect to one of said seats between closed positions substantially wholly within their respective seats and full open positions remote therefrom;
   (d) means defining a first bleed passage from one side to the other side of the upstream one of said seats seats having an effective minimum cross-section less than that of the openings through the upstream seat;
   (e) means defining a second bleed passage through the valve member and valve actuating member cooperating with the downstream seat and having an effective cross-sectional area intermediate that of said first bleed passage and that of the openings through said valve seats;
   (f) means interconnecting said valve actuating members so that the result of any differential pressure across either of said valve members tending to impart opening or closing movements thereto is transmitted to the other of said valve members to tend to impart like movement thereto; and
   (g) means for selectively controlling the effective size of said second bleed passage with respect to that of said first bleed passage;
whereby said members may be moved concomitantly between their open and closed positions by varying the size of said second bleed passage while line pressure is applied to said valve.

5. A valve comprising:
   (a) a valve body having a pair of aligned apertured valve seats having openings of like cross-sectional area, inlet and outlet passages leading thereto and a chamber interposed therebetween;
   (b) a pair of valve members pivotally mounted about parallel axes for opening and closing movements between limit positions within said chamber with respect to one of said seats;
   (c) means defining a first bleed passage from one side to the other side of the upstream one of said seats having an effective minimum cross-section less than that of the openings through the upstream seat;
   (d) means defining a second bleed passage through the valve member cooperating with the downstream seat and having an effective cross-sectional area intermediate that of said first bleed passage and that of the openings through said valve seats;

(e) means interconnecting said valve members so that the result of any differential pressure across either of said valve members tending to impart opening or closing movements thereto is transmitted to the other of said valve members to tend to impart like movement thereto, said interconnecting means comprising a link pivotally connected at its opposite ends to said valve members about parallel axes parallel to said valve member pivot axes, the plane defined by the link pivot axes intersecting the plane defined by said valve actuating member pivot axes in a line intermediate said valve member pivot axes in all normal positions of said link; and (f) means for selectively controlling the effective size of said second bleed passage with respect to that of said first bleed passage;

whereby said members may be moved concomitantly between their open and closed positions by varying the size of said second bleed passage while line pressure is applied to said valve.

6. A valve comprising:
(a) a valve body having a pair of aligned apertured self-aligning valve seats having openings of like cross-sectional area, inlet and outlet passages leading thereto and a chamber interposed therebetween;
(b) a pair of valve actuating members pivotally mounted about parallel axes for opening and closing movements between limit positions within said chamber with respect to one of said seats;
(c) a valve member mounted on each said valve actuating member for self-aligning motion with respect thereto incident to valve closure;
(d) means defining a first bleed passage from one side to the other side of the upstream one of said seats having an effective minimum cross-section less than that of the openings through the upstream seat;
(e) means defining a second bleed passage through the valve member and valve actuating member cooperating with the downstream seat and having an effective cross-sectional area intermediate that of said first bleed passage and that of the openings through said valve seats;
(f) means interconnecting said valve members so that the result of any differential pressure across either of said valve members tending to impart opening or closing movements thereto is transmitted to the other of said valve members to tend to impart like movement thereto, said interconnecting means comprising a link pivotally connected at its opposite ends to said valve actuating members about parallel axes parallel to said valve actuating member pivot axes, the plane defined by the link pivot axes intersecting the plane defined by said valve actuating member pivot axes in a line intermediate said valve actuating member pivot axes in all normal positions of said link; and
(g) means for selectively controlling the effective size of said second bleed passage with respect to that of said first bleed passage, said means comprising a butterfly valve pivotally mounted within said second bleed passage upon pivots located on said downstream valve actuating member externally of said second bleed passage;

whereby said valve members may be moved concomitantly between their open and closed positions by varying the size of said second bleed passage while line pressure is applied to said valve.

7. A self-aligning valve seat construction comprising:
(a) a valve body portion having a port formed by an annular interior wall;
(b) a valve seat forming sleeve having an annular exterior wall and disposed within said body portion port;
(c) one of said annular walls having an annular groove therein and the other of said annular walls having an annular rib aligned with said annular groove;

(d) an O-ring disposed within and resiliently deformed within said groove by said rib to form a fluid tight seal between said annular walls;
(e) the diameter of the sleeve annular wall being less than the diameter of the body port annular wall at each side of said rib and groove to permit limited canting of said sleeve relative to said body while maintaining the fluid tight integrity of said seal; and
(f) means for limiting relative axial movement between said sleeve and body in at least one direction.

8. A self-aligning valve seat construction comprising:
(a) a valve body portion having a cylindrical wall formed with an annular groove intermediate its ends;
(b) a generally cylindrical valve seat forming sleeve disposed within said body portion internally of said cylindrical wall;
 (b1) the portion of the exterior wall of said sleeve which is in alignment with said annular groove having an outside diameter subsantially equal to the internal diameter of said wall at the opposite sides of said annular groove and the remainder of said sleeve having an outside diameter less than the internal diameter of said cylindrical wall to define annular spaces between said sleeve and wall at opposite sides of said annular groove permitting canting of the axis of said sleeve relative to that of said cylindrical wall;
(c) an O-ring disposed and slightly resiliently deformed within said annular groove between the base wall thereof and the exterior surface of said sleeve to preclude fluid passage therebetween; and
(d) means for retaining said sleeve against axial motion relative to said cylindrical wall.

9. In combination:
(a) an apertured valve actuating member mounted for movement between limit positions establishing the open and closed positions of a valve;
(b) an apertured valve member;
(c) a sleeve extending within the aperture of and fixed at one end to one of said members and extending at its other end within the aperture of the other of said members; and
(d) means interconnecting said sleeve other end and said other member to prevent relative axial motion therebetween while permitting limited relative canting motion and preventing fluid flow therebetween so that the aperture of said other member and the interior of said sleeve define a continuous fluid passage through said members.

10. The combination defined in claim 9 wherein the external diameter of the exterior wall of said sleeve within the aperture of the other of said members is substantially less than the diameter of the internal wall of said other member aperture and wherein said last named means comprises an O-ring radially resiliently deformed between said walls and axially confined on one of said walls.

11. In combination:
(a) an apertured valve actuating member mounted for movement between limit positions establishing the open and closed positions of a valve;
(b) an apertured valve member;
(c) a sleeve extending within the aperture of and fixed at one end to one of said members and extending at its other end within the aperture of the other of said members;
(d) means interconnecting said sleeve other end and said other member to prevent relative axial motion therebetween while permitting limited relative canting motion and preventing fluid flow therebetween so that the aperture of said other member and the interior of said sleeve define a continuous fluid passage through said members;
(e) the end of said sleeve within said actuating member defining a valve seat; and (f) a second valve member mounted on said actuating member for opening and closing movements relative to the valve seat defined by said sleeve.

12. The combination defined in claim 11 wherein said second valve member is a butterfly type valve member and wherein means are provided for articulating said butterfly valve member relative to said sleeve about an axis extending diametrally of the interior wall of said sleeve.

13. The combination defined in claim 12 wherein said last named means is located externally of said sleeve.

14. A valve comprising:
(a) a body having a chamber, an inlet and an outlet with respective associated upstream and downstream ports with said chamber therebetween, and individual gates provided within said chamber for each of said ports;
(b) means separately mounting said gates in said chamber on parallel axes for swinging movement into sealed engagement with said ports and away from said sealed engagement position to a position within said chamber;
(c) a linkage interconnecting and synchronizing movements of both gates in an opening direction and a closing direction;
(d) means to by-pass said gates and provide fluid communication from the upstream side of the upstream gate into said chamber and from said chamber to the downstream side of the downstream gate, including control means with a rotatable operator enabling selective variation of the relative values of differential fluid pressure across the upstream gate and across the downstream gate, said by-pass means comprising:
  (1) a by-pass from one side to the other side of said upstream gate;
  (2) a controllable by-pass through the downstream gate comprising a port through said downstream gate and a valve closure pivotally mounted on said downstream gate for opening and closing movement from and into sealed engagement with said gate port, said two by-passes being capable of relative operation to enable the flow area through said downstream by-pass to exceed the flow area of said upstream by-pass; and
  (3) valve actuating means including said rotatable operator, mounting said rotatable operator on an axis common to the axis on which said downstream gate is swung and constrained pivoted linkage means connected to said valve closure including an operating lever nonrotatably connected to and enabled to be selectively rocked by movement of said rotatable operator;

such linkage means thereby constituting an arrangement by which selective movement of said operator will vary at least the downstream by-pass action to change the differential pressure across the downstream gate causing an unbalanced condition of differential pressure across the upstream gate relative to that across the downstream gate thereby enabling synchronized movement of said two gates, the resultant direction of swinging movement of the downstream gate about its axis being the same as the direction of control movement initially imparted to said operator and thereby automatically imparting a kinematic inversion feed back action through said downstream by-pass control linkage to said valve closure tending to cancel the variation of differential pressure across the downstream gate to thereby create a balanced differential pressure condition at a new position of said synchronized interconnected gates, which new position is directly related to the amount of control movement and the direction of movement initially imparted to said operator.

15. A valve as defined in claim 14 wherein said upstream by-pass comprises means providing a fluid bleed passage around said upstream gate and incorporating selectively operable valve means to control passage of fluid through said bleed passage.

16. A valve as defined in claim 14 wherein said upstream by-pass comprises means providing a fluid by-pass passage through said upstream gate and linkage, including exterior releasable links connecting to said rotatable operator enable a correlated control between said upstream by-pass and said downstream by-pass whereby when one by-pass is open the other by-pass is closed and whereby movement of one by-pass toward its closed condition is accompanied by a correlated movement of the other by-pass toward its opened condition.

References Cited
UNITED STATES PATENTS

| | | | |
|---|---|---|---|
| 1,483,390 | 2/1924 | Snow | 137—613 |
| 1,985,382 | 12/1934 | Schachter | 251—363 |
| 2,092,452 | 9/1937 | Gilbert | 137—629 |
| 3,084,904 | 4/1963 | McGay | 251—218 |
| 3,191,619 | 6/1965 | Allen | 137—527.4 |

WILLIAM F. O'DEA, *Primary Examiner.*

H. COHN, *Assistant Examiner.*